US012109674B2

(12) United States Patent
Ko et al.

(10) Patent No.: US 12,109,674 B2
(45) Date of Patent: Oct. 8, 2024

(54) HYDRAULIC BREAKER

(71) Applicant: HYUNDAI EVERDIGM CORPORATION, Chungcheongbuk-do (KR)

(72) Inventors: Kwang Pyo Ko, Cheongju-si (KR); Jin Kook Kim, Daejeon (KR)

(73) Assignee: HYUNDAI EVERDIGM CORPORATION, Chungcheongbuk-do (KR)

( * ) Notice: Subject to any disclaimer, the term of this patent is extended or adjusted under 35 U.S.C. 154(b) by 191 days.

(21) Appl. No.: 17/783,459

(22) PCT Filed: Dec. 16, 2020

(86) PCT No.: PCT/KR2020/018422

§ 371 (c)(1),
(2) Date: Jun. 8, 2022

(87) PCT Pub. No.: WO2021/141268

PCT Pub. Date: Jul. 15, 2021

(65) Prior Publication Data

US 2023/0018715 A1 Jan. 19, 2023

(30) Foreign Application Priority Data

Jan. 8, 2020 (KR) ........................ 10-2020-0002356

(51) Int. Cl.
*B25D 9/12* (2006.01)
*B02C 1/00* (2006.01)
(Continued)

(52) U.S. Cl.
CPC ................ *B25D 9/12* (2013.01); *B02C 1/005* (2013.01); *F15B 15/02* (2013.01);
(Continued)

(58) Field of Classification Search
CPC ...... B25D 9/12; B25D 9/20; B25D 2209/005; B25D 9/145; B25D 2250/125; E02F 3/966; B02C 1/005; F15B 15/02; E02D 7/10
(Continued)

(56) References Cited

U.S. PATENT DOCUMENTS 3,945,442 A * 3/1976 Amtsberg ................. E21B 1/36
91/171
3,971,448 A * 7/1976 Crover ..................... B25D 9/18
173/208
(Continued)

FOREIGN PATENT DOCUMENTS

DE 388 335 C 1/1924
KR 10-2003-0031955 A 4/2003
(Continued)

OTHER PUBLICATIONS

Korean Office Action issued on Oct. 18, 2021, in the counter Korean Application No. 10- 2020-0002356. (2 pages in Korean).
(Continued)

*Primary Examiner* — Dariush Seif
(74) *Attorney, Agent, or Firm* — NSIP Law

(57) ABSTRACT

The present invention relates to a hydraulic breaker. The valve is installed on an inner surface of the cylinder bush and the cylinder inner diameter portion to be movable in the vertical direction. The valve includes an upper valve portion having an upper end surface on which the pressure of the upper cylinder chamber acts, a lower valve portion having a lower end surface on which the pressure of the upper cylinder chamber acts, a first valve expanded-diameter portion which is formed between the upper valve portion and the lower valve portion, of which an outer diameter expands to be greater than outer diameters of the upper valve portion and the lower valve portion, and in which a first upper valve
(Continued)

hydraulic pressure area communicates with the first and second flow channels, and a second valve expanded-diameter portion which is formed between the first valve expanded-diameter portion and the lower valve portion, of which an outer diameter expands to be greater than an outer diameter of the first valve expanded-diameter portion, and in which the second upper valve hydraulic pressure area communicates with the fourth flow channel, and the pressure of the valve switching chamber acts on a lower valve hydraulic pressure area having an area greater than an area of the first upper valve hydraulic pressure area.

3 Claims, 10 Drawing Sheets

(51) Int. Cl.
*E02D 7/10* (2006.01)
*E02F 3/96* (2006.01)
*F15B 15/02* (2006.01)

(52) U.S. Cl.
CPC .......... *B25D 2250/125* (2013.01); *E02D 7/10* (2013.01); *E02F 3/966* (2013.01)

(58) Field of Classification Search
USPC .......................................................... 173/206
See application file for complete search history.

(56) References Cited

U.S. PATENT DOCUMENTS

| | | | | | | |
|---|---|---|---|---|---|---|
| 4,084,486 | A | * | 4/1978 | Juvonen | B25D 9/12 | 91/320 |
| 4,142,447 | A | * | 3/1979 | Krasnoff | F03C 1/007 | 91/321 |
| RE30,109 | E | * | 10/1979 | Bouyoucos | F01L 17/00 | 91/321 |
| 4,203,350 | A | * | 5/1980 | Wallace | B25D 9/145 | 91/320 |
| 4,343,227 | A | * | 8/1982 | Karru | B25D 9/12 | 91/298 |
| 4,460,051 | A | * | 7/1984 | Widmer | B25D 17/24 | 173/208 |
| 4,646,854 | A | * | 3/1987 | Arndt | B25D 9/145 | 91/321 |
| 4,852,664 | A | * | 8/1989 | Terada | B25D 9/12 | 91/398 |
| 4,858,702 | A | * | 8/1989 | Piras | B25D 9/145 | 173/208 |
| 4,945,998 | A | * | 8/1990 | Yamanaka | B25D 9/145 | 92/216 |
| 5,022,309 | A | * | 6/1991 | Campbell | B25D 9/26 | 91/335 |
| 5,117,921 | A | * | 6/1992 | Bartels | E21B 44/06 | 173/13 |
| 5,129,466 | A | * | 7/1992 | Bartels | B25D 9/145 | 91/278 |
| 5,134,989 | A | * | 8/1992 | Akahane | B25D 9/145 | 173/206 |
| 5,392,865 | A | * | 2/1995 | Piras | B25D 9/145 | 173/208 |
| 5,408,768 | A | * | 4/1995 | Karani | E02F 9/221 | 172/776 |
| 5,960,893 | A | | 10/1999 | Prokop et al. | | |
| 6,073,706 | A | * | 6/2000 | Niemi | B25D 9/18 | 173/208 |
| 6,829,975 | B2 | | 12/2004 | Piras | | |
| 10,472,797 | B2 | | 11/2019 | Park | | |
| 2002/0014342 | A1 | * | 2/2002 | White | E02D 7/10 | 173/206 |
| 2003/0089222 | A1 | * | 5/2003 | Olsson | F03C 1/007 | 91/417 R |
| 2003/0183402 | A1 | * | 10/2003 | Piras | B25D 9/20 | 173/206 |
| 2005/0016774 | A1 | * | 1/2005 | Comarmond | B25D 16/00 | 175/417 |
| 2005/0145400 | A1 | * | 7/2005 | Ottestad | B25D 9/12 | 173/91 |
| 2009/0250234 | A1 | * | 10/2009 | Piras | B25D 9/18 | 173/207 |
| 2009/0321100 | A1 | * | 12/2009 | Andersson | E21B 1/02 | 173/206 |
| 2010/0193212 | A1 | * | 8/2010 | Konecnik | B25D 9/265 | 173/218 |
| 2012/0138328 | A1 | * | 6/2012 | Teipel | B25D 9/20 | 173/171 |
| 2013/0327551 | A1 | * | 12/2013 | Donse | F15B 11/15 | 251/63 |
| 2013/0327555 | A1 | * | 12/2013 | Pettersson | E21B 1/38 | 173/200 |
| 2014/0261827 | A1 | * | 9/2014 | Moore | F16J 1/09 | 138/30 |
| 2014/0262406 | A1 | * | 9/2014 | Moore | B25D 9/20 | 173/208 |
| 2014/0345896 | A1 | * | 11/2014 | Raunisto | B25D 9/12 | 173/204 |
| 2015/0129269 | A1 | * | 5/2015 | Muuttonen | E21B 1/04 | 173/206 |
| 2015/0290788 | A1 | * | 10/2015 | Johansson | B25D 9/26 | 173/1 |
| 2016/0053541 | A1 | * | 2/2016 | Hämäläinen | B25D 17/06 | 175/296 |
| 2016/0138728 | A1 | * | 5/2016 | Hämäläinen | E21B 1/38 | 251/12 |
| 2017/0001294 | A1 | * | 1/2017 | Koizmui | B25D 9/12 | |
| 2017/0072551 | A1 | * | 3/2017 | Moore | F16C 29/126 | |
| 2017/0080555 | A1 | * | 3/2017 | Moore | B25D 9/22 | |
| 2017/0259421 | A1 | * | 9/2017 | Grzybowski | B25D 9/12 | |
| 2018/0133882 | A1 | * | 5/2018 | Moore | B25D 9/12 | |
| 2018/0163366 | A1 | * | 6/2018 | Park | E02F 3/966 | |
| 2018/0238428 | A1 | * | 8/2018 | Vulcan | B25D 9/145 | |
| 2019/0160642 | A1 | * | 5/2019 | Joo | E02F 5/30 | |
| 2020/0181978 | A1 | * | 6/2020 | Koizumi | B25D 9/26 | |
| 2021/0087786 | A1 | * | 3/2021 | Lee | F16N 7/38 | |
| 2022/0024012 | A1 | * | 1/2022 | Ito | B25D 9/145 | |

FOREIGN PATENT DOCUMENTS

| | | | |
|---|---|---|---|
| KR | 10-0999867 | B1 | 12/2010 |
| KR | 10-2014-0142436 | A | 12/2014 |
| KR | 20-2014-0006394 | A | 12/2014 |
| KR | 10-2015-0055592 | A | 5/2015 |
| KR | 10-1709673 | B1 | 3/2017 |
| WO | WO 2012/168559 | A1 | 12/2012 |

OTHER PUBLICATIONS

International Search Report issued on May 27, 2021, in the corresponding PCT/KR2020/018422 (2 pages in English and 2 pages in Korean).

Extended European search report issued on Nov. 20, 2023, in counterpart European Patent Application No. 20911752.2 (7 pages).

* cited by examiner

HYDRAULIC BREAKER

CROSS REFERENCE TO RELATED APPLICATIONS

This application is a U.S. National Stage Application of International Application No. PCT/KR2020/018422, filed on Dec. 16, 2020, which claims the benefit under 35 USC 119(a) and 365(b) of Korean Patent Application No. 10-2020-0002356, filed on Jan. 8, 2020, in the Korean Intellectual Property Office, the entire disclosure of which are incorporated herein by reference for all purposes.

TECHNICAL FIELD

The present invention relates to a hydraulic breaker which breaks a breaking target using hydraulic pressure as driving power, and more specifically, to a valve structure of a hydraulic breaker.

BACKGROUND ART

Hydraulic breakers are apparatuses which transmit kinetic energy, which is generated by making pistons reciprocate in cylinders using hydraulic pressure, to a chisel, convert the kinetic energy to impact energy, and break breaking targets using the impact energy. Hydraulic breakers are used for crushing concrete, mining stone at stone mining sites, building interior construction, and driving piles around roads during road construction.

Generally, a hydraulic breaker includes a cylinder having an upper cylinder chamber and a lower cylinder chamber, a piston installed to be vertically movable and pass through the cylinder, a chisel installed under the cylinder to be struck by the piston, and a valve which controls hydraulic oil to make the piston reciprocate.

FIG. 9 is a cross-sectional view illustrating a valve device of a conventional hydraulic breaker. FIG. 10 is a cross-sectional view illustrating the operation of the valve device illustrated in FIG. 9.

As illustrated in FIG. 9, since an area S1 of a lower end portion of a valve 1 is smaller than an area S2 of an upper end portion of the valve 1, when pressure is generated in an upper cylinder chamber 2, the valve 1 is always in a lowered state. As illustrated in FIG. 10, when a piston 5 moves upward and hydraulic oil is supplied to a valve switching chamber 3, a relationship of (SF+S1)> S2 is established due to a central portion area SF of the valve 1, and the valve 1 moves upward.

A force acting on upper and lower end portions of the valve 1 may be changed according to the pressure in the upper cylinder chamber 2, and the pressure of the upper cylinder chamber 2 may be determined by a size of a valve orifice 4.

When the pressure of the upper cylinder chamber 2 is kept constant, the force acting on the upper and lower end portions of the valve 1 is also kept constant, and reciprocal movement of the valve 1 is performed uniformly and regularly. However, when a temperature increases, since the viscosity of the hydraulic oil decreases, a flow rate of the hydraulic oil discharged through the valve orifice 4 increases, and thus the pressure acting on the upper and lower end portions of the valve 1 is changed due to a pressure drop in the upper cylinder chamber 2.

In addition, when the piston 5 reciprocates, since the pressure of the upper cylinder chamber 2 is frequently changed because the upper cylinder chamber 2 alternately communicates with a high pressure flow channel Pr and a lower pressure flow channel Ps, the pressure applied to the upper and lower end portions of the valve 1 is changed. When the pressure acting on the upper and lower end portions of the valve 1 is changed, since the ascending and descending speed and time of the valve 1 are changed, the valve 1 may not move uniformly and regularly. In this regard, there is a technology as disclosed in U.S. Pat. No. 5,960,893 (Registered on Oct. 5, 1999).

Technical Problem

The present invention is directed to providing a hydraulic breaker capable of being uniformly regularly operated even when a viscosity and a flow rate are changed according to a temperature of hydraulic oil.

Technical Solution

One aspect of the present invention provides a hydraulic breaker includes a cylinder, a piston, a chisel, a back head, a cylinder bush, and a valve. In the cylinder, a cylinder inner diameter portion is formed in a central portion, an upper cylinder chamber, a cylinder low pressure chamber, a cylinder switching chamber, and a lower cylinder chamber are sequentially formed in a downward direction, and a valve low pressure chamber and a valve switching chamber are sequentially formed in the upper cylinder chamber in the downward direction. The cylinder includes a first flow channel connected to a hydraulic oil inlet port in a state in which the upper cylinder chamber and the lower cylinder chamber are connected, a second flow channel connecting the lower cylinder chamber and the upper cylinder chamber, a third flow channel connecting the cylinder switching chamber and the valve switching chamber, and a fourth flow channel connected to a hydraulic oil outlet port in a state in which the cylinder low pressure chamber and the valve low pressure chamber are connected, The piston may be installed in the cylinder inner diameter portion to be movable in a vertical direction. The chisel may be installed under the cylinder to be struck by the piston. The back head may be disposed on the cylinder and may include a gas chamber into which an upper end portion of the piston is inserted. The cylinder bush may be installed in the cylinder inner diameter portion and may be coaxial with the piston, and the piston may be accommodated to be movable in the vertical direction The valve may be installed on an inner surface of the cylinder bush and the cylinder inner diameter portion to be movable in the vertical direction. The valve may include an upper valve portion having an upper end surface on which the pressure of the upper cylinder chamber acts, a lower valve portion having a lower end surface on which the pressure of the upper cylinder chamber acts, a first valve expanded-diameter portion which is formed between the upper valve portion and the lower valve portion, of which an outer diameter expands to be greater than outer diameters of the upper valve portion and the lower valve portion, and in which a first upper valve hydraulic pressure area communicates with the first and second flow channels, and a second valve expanded-diameter portion which is formed between the first valve expanded-diameter portion and the lower valve portion, of which an outer diameter expands to be greater than an outer diameter of the first valve expanded-diameter portion, and in which the second upper valve hydraulic pressure area communicates with the fourth flow channel, and the pressure of the valve switching chamber acts on a lower valve hydraulic pressure area having an area greater than an area of the first upper valve hydraulic pressure area.

In addition, an upper end surface of the upper valve portion and a lower end surface of the lower valve portion may have the same area. The piston may include a flow channel groove which selectively allows or blocks communication between the cylinder switching chamber and the cylinder low pressure chamber when the piston moves in the vertical direction.

Advantageous Effects

According to the present invention, when compared to a convention valve, since a valve can be vertically moved only by high pressure without being affected by the pressure of an upper cylinder chamber, the valve can be uniformly and regularly operated even with changes in viscosity and flow rate according to a temperature of hydraulic oil.

According to the present invention, since a piston is accommodated to move vertically along an inner diameter portion of a cylinder and an inner diameter portion of a cylinder bush, the valve can be positioned as close as possible to a sliding portion of the piston, a length of the cylinder is decreased, and thus there is an effect of reducing manufacturing costs.

MODES OF THE INVENTION

Figure 1:
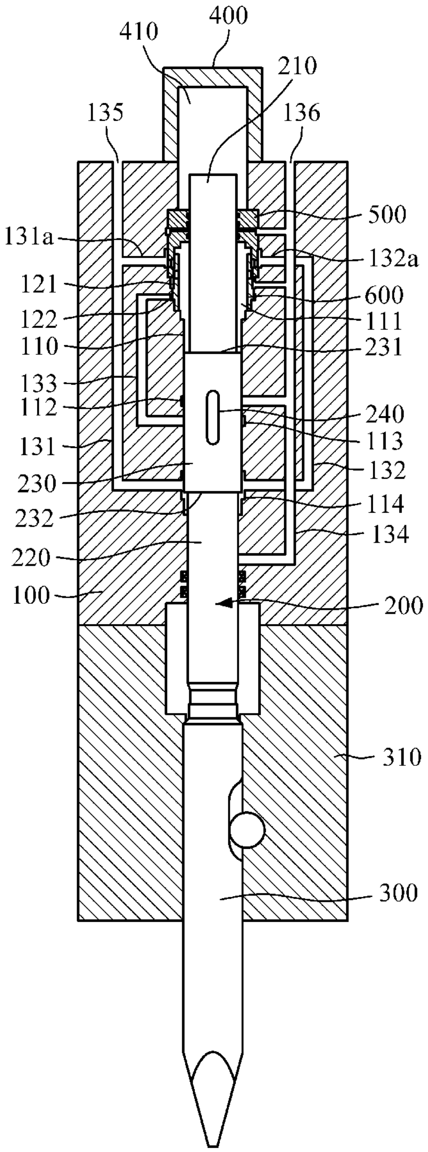
FIG. 1 is a cross-sectional view illustrating a hydraulic breaker according to one embodiment of the present invention.

Hereinafter, the present invention will be described in detail with reference to the accompanying drawings. Here, like reference numerals denote like elements, and a repeated description and detailed descriptions of known functions and configurations that may unnecessarily obscure the gist of the present invention will not be repeated. Embodiments of the present invention are provided in order to fully explain the present invention for those skilled in the art. Therefore, shapes and sizes of the elements in the drawings may be exaggerated for clearer description.

Figure 2:
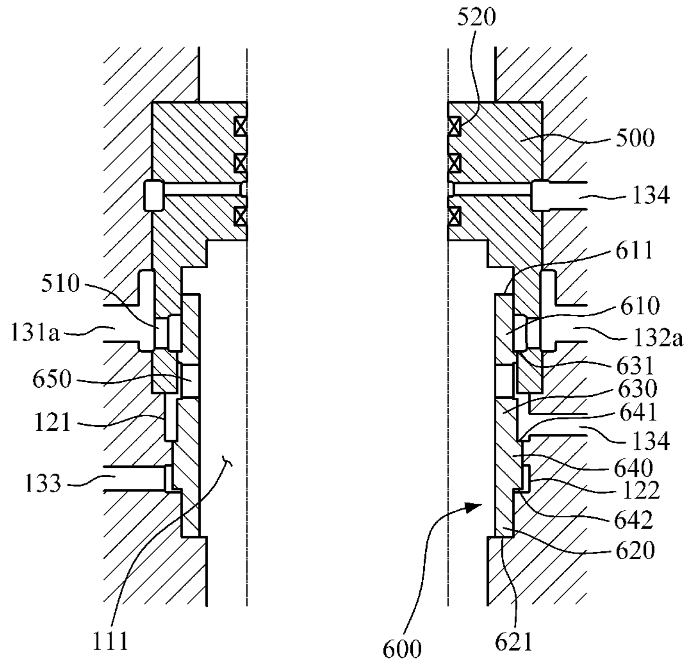
FIG. 2 is an enlarged cross-sectional view illustrating a valve region of FIG. 1.
Figure 3:
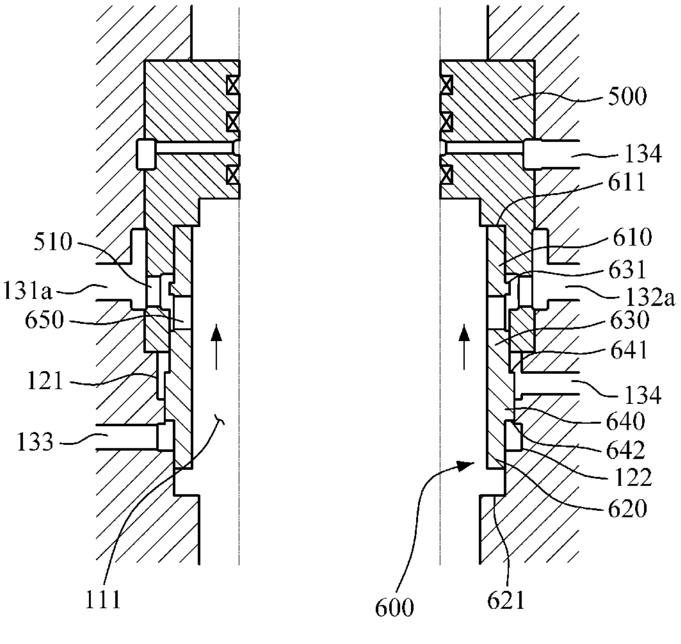
FIG. 3 is a cross-sectional view illustrating an operation state of a valve illustrated in FIG. 2.
Figure 4:
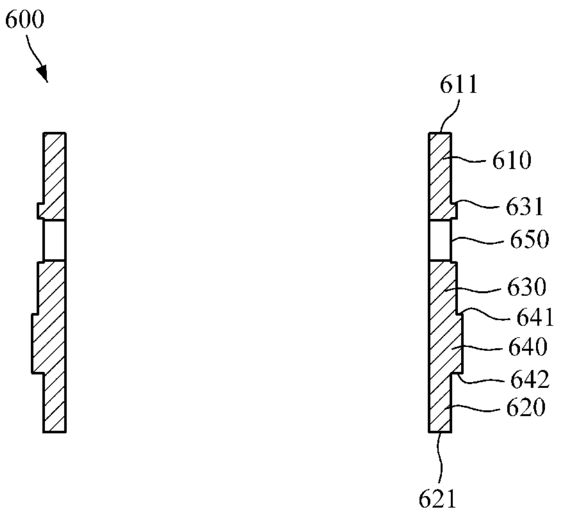
FIG. 4 is a cross-sectional view illustrating the valve included in FIG. 2.

FIG. 1 is a cross-sectional view illustrating a hydraulic breaker according to one embodiment of the present invention. FIG. 2 is an enlarged cross-sectional view illustrating a valve region of FIG. 1. FIG. 3 is a cross-sectional view illustrating an operation state of a valve illustrated in FIG. 2. FIG. 4 is a cross-sectional view illustrating the valve included in FIG. 2.

Referring to FIGS. 1 to 4, the hydraulic breaker according to one embodiment of the present invention includes a cylinder 100, a piston 200, a chisel 300, a back head 400, a cylinder bush 500, and a valve 600.

A cylinder inner diameter portion 110 is formed in a central portion of the cylinder 100. The cylinder 100 supports the piston 200 so that the piston 200 is movable in a vertical direction in a state in which the piston 200 is accommodated in the cylinder inner diameter portion 110. In the cylinder 100, an upper cylinder chamber 111, a cylinder low pressure chamber 112, a cylinder switching chamber 113, and a lower cylinder chamber 114 are sequentially formed in a downward direction. In the cylinder 100, a valve low pressure chamber 121 and a valve switching chamber 122 are sequentially formed in the upper cylinder chamber 111 in the downward direction.

The cylinder 100 includes a first flow channel 131 connected to a hydraulic oil inlet port 135 in a state in which the upper cylinder chamber 111 and the lower cylinder chamber 114 are connected, a second flow channel 132 connecting the lower cylinder chamber 114 and the upper cylinder chamber 111, a third flow channel 133 connecting the cylinder switching chamber 113 and the valve switching chamber 122, and a fourth flow channel 134 connected to a hydraulic oil outlet port 136 in a state in which the cylinder low pressure chamber 112 and the valve low pressure chamber 121 are connected.

In a state in which the valve 600 is switched off, the upper cylinder chamber 111 communicates with the fourth flow channel 134 through a valve orifice 650, and when the valve 600 is switched on, the upper cylinder chamber 111 communicates with branched flow channels **131*a* and 132*a* of the first and second flow channels 131 and 132. A hydraulic pressure supply source of an apparatus in which the hydraulic breaker is installed is connected to the hydraulic oil inlet port 135**.

Hydraulic oil introduced into the hydraulic oil inlet port 135 branches off to the branched flow channels **131*a* and 132*a* of the first and second flow channels 131 and 132 and is supplied to the lower cylinder chamber 114 through the first and second flow channels 131 and 132. Accordingly, since a high pressure state is always maintained in the lower cylinder chamber 114, a force to move the piston 200** upward is applied.

The piston 200 is installed in the cylinder inner diameter portion 110 to be movable in the vertical direction. The piston 200 may have a form in which a large diameter portion 230 having a diameter greater than a diameter of an upper end portion 210 and a diameter of a lower end portion 220 is formed between the upper end portion 210 and the lower end portion 220. The upper end portion 210 of the piston 200 has a smaller diameter than the lower end portion 220 of the piston 200.

Accordingly, in the piston 200, due to a difference in diameter between the upper end portion 210 and the lower end portion 220, an upper end piston hydraulic pressure area 231 is formed on an upper surface of the large diameter portion 230, and a lower end piston hydraulic pressure area 232 is formed on a lower surface of the large diameter portion 230. In this case, since the diameter of the upper end portion 210 of the piston 200 is smaller than the diameter of the lower end portion 220 of the piston 200, the upper end piston hydraulic pressure area 231 is formed to be greater than the lower end piston hydraulic pressure area 232.

In addition, when the hydraulic oil, which applies pressure, is supplied to the upper end piston hydraulic pressure area 231 and the lower end piston hydraulic pressure area 232, upward and downward strokes of the piston 200 are performed due to a difference in the magnitude of the force generated by the hydraulic oil.

The piston 200 may include a flow channel groove 240 which selectively allows or blocks communication between the cylinder switching chamber 113 and the cylinder low pressure chamber 112 when the piston 200 moves in the vertical direction.

The flow channel groove 240 allows the cylinder switching chamber 113 and the cylinder low pressure chamber 112 to communicate with each other in a state in which the piston 200 moves downward to bottom dead center and blocks communication between the cylinder switching chamber 113 and the cylinder low pressure chamber 112 in a state in which the piston 200 moves upward to top dead center.

In a case in which the flow channel groove 240 is formed in the piston 200, even when only one large diameter portion 230 is formed in the piston 200 instead of separately forming two or more large diameter portions, the cylinder switching chamber 113 and the cylinder low pressure chamber 112 may communicate with each other, and since the large diameter portion 230 may be formed to have a long length, the piston 200 moves within an inner diameter of the cylinder when the piston 200 moves upward, and thus there is an advantage in terms of scratches on the cylinder and the piston, and the piston 200 having a robust structure can also be manufactured.

The chisel 300 is installed under the cylinder 100 to be struck by the piston 200. The chisel 300 may be installed through a front head 310 connected to a lower side of the cylinder 100. The front head 310 is connected so that an upper opening thereof communicates with a lower opening of the cylinder 100. The chisel 300 is partially inserted through the lower opening of the front head 310, and the chisel 300 is struck by downward movement of the piston 200 and breaks a breaking target.

The back head 400 is disposed on the cylinder 100 and includes a gas chamber 410 into which an upper end portion of the piston 200 is inserted. The back head 400 is assembled on an upper surface of the cylinder 100, fixes an upper end of the cylinder bush 500, and forms the gas chamber 410 above the upper end portion of the piston 200. Compressed gas fills an inner portion of the gas chamber 410 so that a downward force always acts on an upper end surface of the piston 200. In this case, a pressure of the gas filling the gas chamber is set so as to apply a force smaller than an upward force acting on the lower end piston hydraulic pressure area 232 of the piston 200.

The cylinder bush 500 is installed in the cylinder inner diameter portion 110 and is coaxial with the piston 200, and the piston 200 is accommodated in the cylinder bush 500 to be movable in the vertical direction. The cylinder bush 500 includes a hollow vertically passing therethrough, and the piston 200 is accommodated in the cylinder bush 500 through the hollow. Since the piston 200 is accommodated to be movable along the cylinder inner diameter portion 110 and the inner diameter portion of the cylinder bush 500 in the vertical direction, the valve 600 may be disposed as close as possible to a sliding portion of the piston 200, and thus there is an advantage of reducing manufacturing costs by shortening a length of the cylinder 100.

Air tightness between the cylinder bush 500 and an outer diameter portion of the piston 200 may be maintained by a seal 520 installed on an inner circumferential surface of the cylinder bush 500. The cylinder bush 500 may include a cylinder bush orifice 510 which communicates with or is blocked from the valve orifice 650 according to vertical movement of the valve 600. The cylinder bush orifice 510 communicates with the branched flow channels 131*a* and 132*a* of the first and second flow channels 131 and 132.

The valve 600 is installed on an inner surface of the cylinder bush 500 and the cylinder inner diameter portion 110 to be movable in the vertical direction. The valve 600 controls the hydraulic oil introduced through the hydraulic oil inlet port 135 to make the piston 200 reciprocate. The valve 600 includes an upper valve portion 610, a lower valve portion 620, a first valve expanded-diameter portion 630, and a second valve expanded-diameter portion 640. The valve 600 is formed in a form in which the upper valve portion 610, the lower valve portion 620, the first valve expanded-diameter portion 630, and the second valve expanded-diameter portion 640 are integrated.

In the upper valve portion 610, the pressure of the upper cylinder chamber 111 acts on an upper end surface 611. The upper valve portion 610 has a hollow, and the piston 200 passes through the hollow. The upper valve portion 610 has an inner diameter and an outer diameter which are constant in the vertical direction. The upper valve portion 610 moves vertically in a state in which an outer diameter portion of the upper valve portion 610 and the inner diameter portion of the cylinder bush 500 are in contact with and are supported by each other. In a state in which the upper valve portion 610 moves upward to top dead center, the upper valve portion 610 comes into contact with a step of the inner diameter portion of the cylinder bush 500 and stops.

In the lower valve portion 620, the pressure of the upper cylinder chamber 111 acts on a lower end surface 621. The lower valve portion 620 has a hollow, and the piston 200 passes through the hollow. The lower valve portion 620 has an inner diameter and an outer diameter which are constant in the vertical direction. The lower valve portion 620 and the upper valve portion 610 have the same inner diameter. The lower valve portion 620 moves vertically in a state in which an outer diameter portion of the lower valve portion 620 and the cylinder inner diameter portion 110 are in contact with and are supported by each other. In a state in which the lower valve portion 620 moves downward to bottom dead center, the lower valve portion 620 comes into contact with a step of the cylinder inner diameter portion 110 and stops.

The first valve expanded-diameter portion 630 is formed between the upper valve portion 610 and the lower valve portion 620 so that an outer diameter thereof expands to be greater than the outer diameters of the upper valve portion 610 and the lower valve portion 620. The first valve expanded-diameter portion 630 has a hollow, and the piston 200 passes through the hollow. The first valve expanded-diameter portion 630 has an inner diameter and an outer diameter which are constant in the vertical direction. The first valve expanded-diameter portion 630 has an inner diameter which is the same as the inner diameter of the upper valve portion 610.

In the first valve expanded-diameter portion 630, a first upper valve hydraulic pressure area 631 communicates with the branched flow channels 131*a* and 132*a* of the first and second flow channels 131 and 132. Accordingly, high pressure is always applied to the first upper valve hydraulic pressure area 631. The first valve expanded-diameter portion 630 has the valve orifice 650. The valve orifice 650 is blocked from the branched flow channels 131*a* and 132*a* of the first and second flow channels 131 and 132 when the valve 600 moves to bottom dead center and communicates with the branched flow channels 131*a* and 132*a* of the first and second flow channels 131 and 132 when the valve 600 moves to top dead center.

The second valve expanded-diameter portion 640 is formed between the first valve expanded-diameter portion 630 and the lower valve portion 620 so that an outer diameter thereof expands to be greater than the outer diameter of the first valve expanded-diameter portion 630. The second valve expanded-diameter portion 640 has a hollow, and the piston 200 passes through the hollow. The second valve expanded-diameter portion 640 has an inner diameter and the outer diameter which are constant in the vertical direction. The second valve expanded-diameter portion 640 has an inner diameter which is the same as the inner diameter of the lower valve portion 620.

In the second valve expanded-diameter portion 640, a second upper valve hydraulic pressure area 641 communicates with the fourth flow channel 134, a lower valve hydraulic pressure area 642 communicates with the third flow channel 133, and the lower valve hydraulic pressure area 642 communicates with the valve switching chamber 122 through the third flow channel 133. Accordingly, the pressure of the valve switching chamber 122 acts on the lower valve hydraulic pressure area 642 having an area greater than the first upper valve hydraulic pressure area 631. In this case, since the second upper valve hydraulic pressure area 641 communicates with the fourth flow channel 134, which is always low pressure, movement of the valve 600 is not affected.

High pressure or low pressure selectively acts on the lower valve hydraulic pressure area 642 on which the pressure of the valve switching chamber 122 acts. Since the lower valve hydraulic pressure area 642 has an area greater than an area of the first upper valve hydraulic pressure area 631, an upward or downward stroke of the valve 600 can be performed by the pressure of the valve switching chamber 122.

That is, when the hydraulic oil is not supplied to the valve switching chamber 122, high pressure is always applied to the first upper valve hydraulic pressure area 631 through the branched flow channels 131*a* and 132*a* of the first and second flow channels 131 and 132, and thus the valve 600 maintains a lowered state. When the piston 200 moves upward, and the hydraulic oil is supplied to the valve switching chamber 122 through the third flow channel 133, since the lower valve hydraulic pressure area 642 is wider than the first upper valve hydraulic pressure area 631, the valve 600 moves upward.

In the valve 600, there may be a difference in area between the upper end surface 611 of the upper valve portion 610 and the lower end surface 621 of the lower valve portion 620 at a level that the valve 600 is not affected by the pressure of the upper cylinder chamber 111. For example, the upper end surface 611 of the upper valve portion 610 and the lower end surface 621 of the lower valve portion 620 may have the same area. Therefore, according to the present invention, since the vertical movement of the valve 600 may be performed by only high pressure without being affected by the pressure of the upper cylinder chamber 111, the valve 600 can be uniformly regularly operated even with changes in viscosity and flow rate according to a temperature of the hydraulic oil.

Operation of the hydraulic breaker will be described below with reference to FIGS. 5 to 8.

Figure 5:
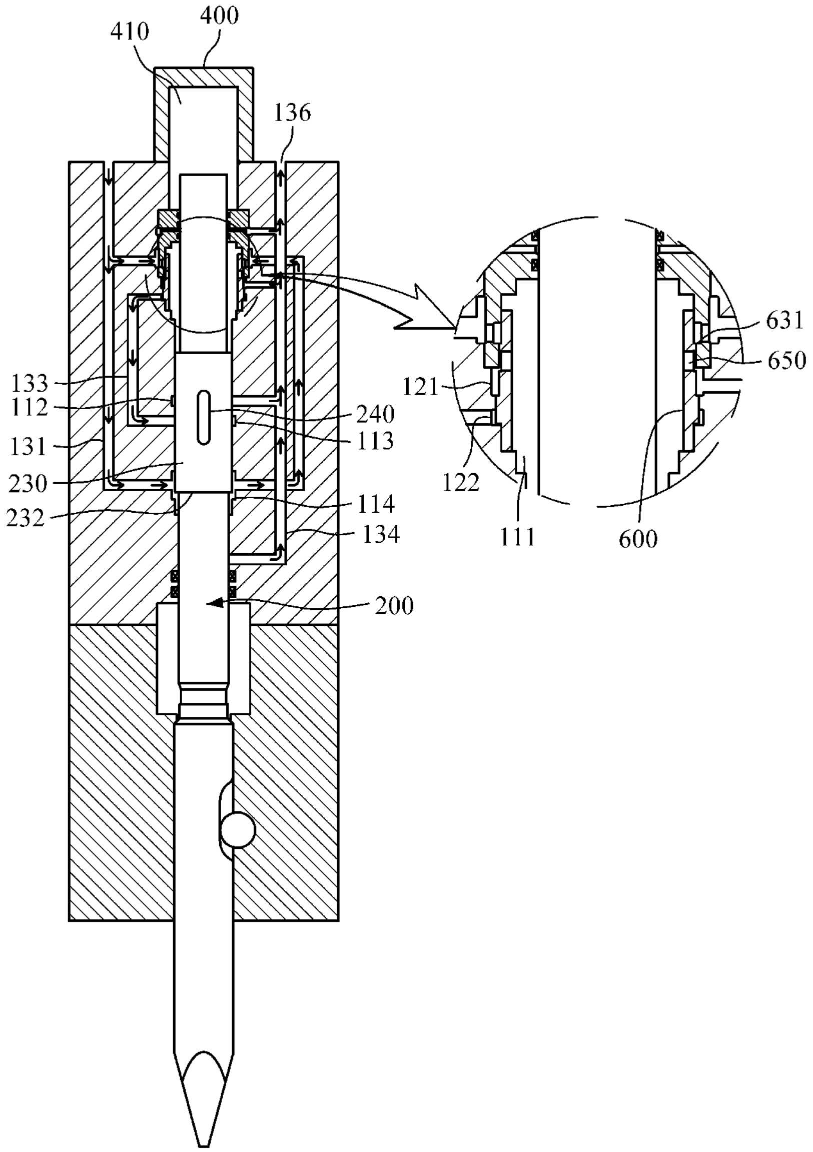
FIGS. 5 to 8 are cross-sectional views for describing operation of the hydraulic breaker.

In an initial operating state of the hydraulic breaker, as illustrated in FIG. 5, the piston 200 is in a lowered state, the valve switching chamber 122 is connected to the cylinder switching chamber 113 through the third flow channel 133. The cylinder switching chamber 113 is connected to the cylinder low pressure chamber 112 by the flow channel groove 240 of the large diameter portion 230 of the piston 200, the cylinder low pressure chamber 112 is connected to the valve low pressure chamber 121 through the fourth flow channel 134, and the fourth flow channel 134 is connected to the hydraulic oil outlet port 136.

As a result, a relatively small force acts on a hydraulic pressure area of the valve switching chamber 122, and high pressure is always applied to the first upper valve hydraulic pressure area 631 of the valve 600 so that the valve 600 maintains a lowered state due to a force acting in a downward direction. In this case, since the valve 600 maintains the lowered state, the upper cylinder chamber 111 communicates with the fourth flow channel 134 through the valve orifice 650 and is connected to the hydraulic oil outlet port 136 so that the upper cylinder chamber 111 enters a low pressure state.

Accordingly, when an operator operates the hydraulic breaker, high pressure hydraulic oil is introduced into the lower cylinder chamber 114 through the first flow channel 131, and thus a pressure of the lower cylinder chamber 114 increases. Accordingly, an upward force acting on the lower end piston hydraulic pressure area 232 of the piston 200 increases, and the piston 200 moves upward. In this case, gas in the back head 400 is compressed to increase the pressure in the gas chamber 410.

Figure 6:
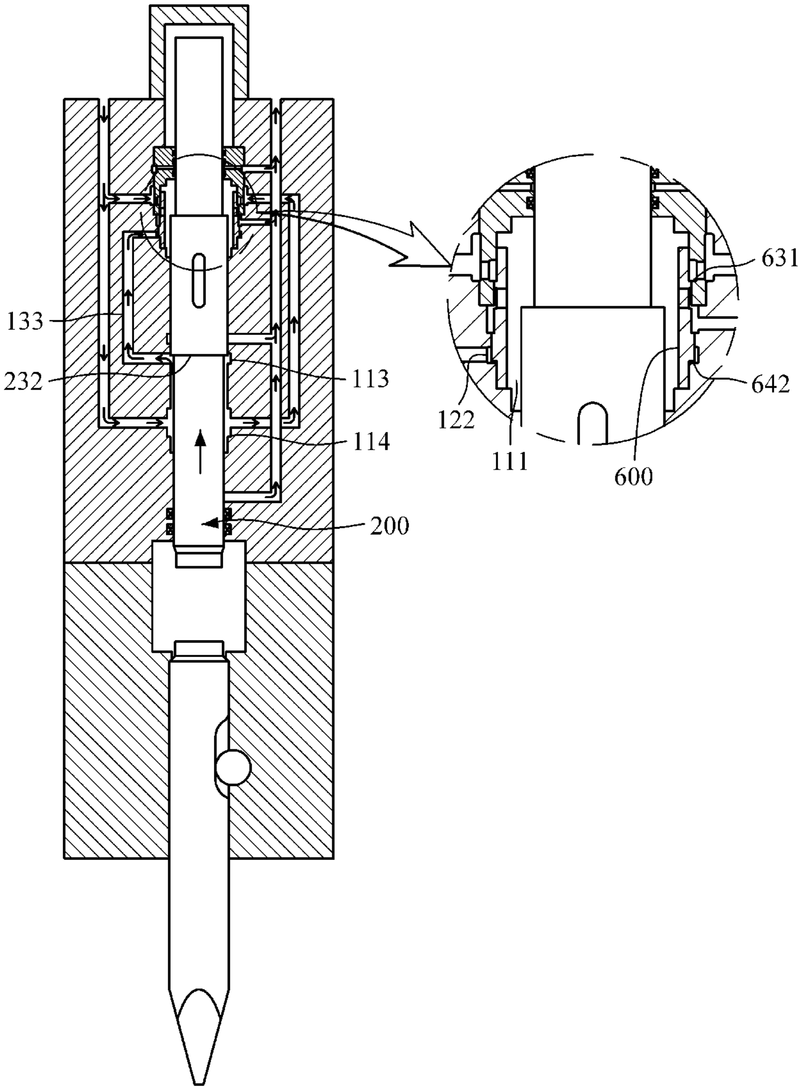

Then, the piston 200 moves upward, and as illustrated in FIG. 6, when the lower end piston hydraulic pressure area 232 of the piston 200 passes the cylinder switching chamber 113, the lower cylinder chamber 114 communicates with the cylinder switching chamber 113. Since the cylinder switching chamber 113 is connected to the valve switching chamber 122 through the third flow channel 133, high pressure is generated in the valve switching chamber 122 which is the same as the pressure in the lower cylinder chamber 114. Accordingly, since the lower valve hydraulic pressure area 642 is wider than the first upper valve hydraulic pressure area 631 of the valve 600, an upward force acting on the lower valve hydraulic pressure area 642 is greater than a downward force acting on the first upper valve hydraulic pressure area 631, and thus the valve 600 moves upward.

Figure 7:
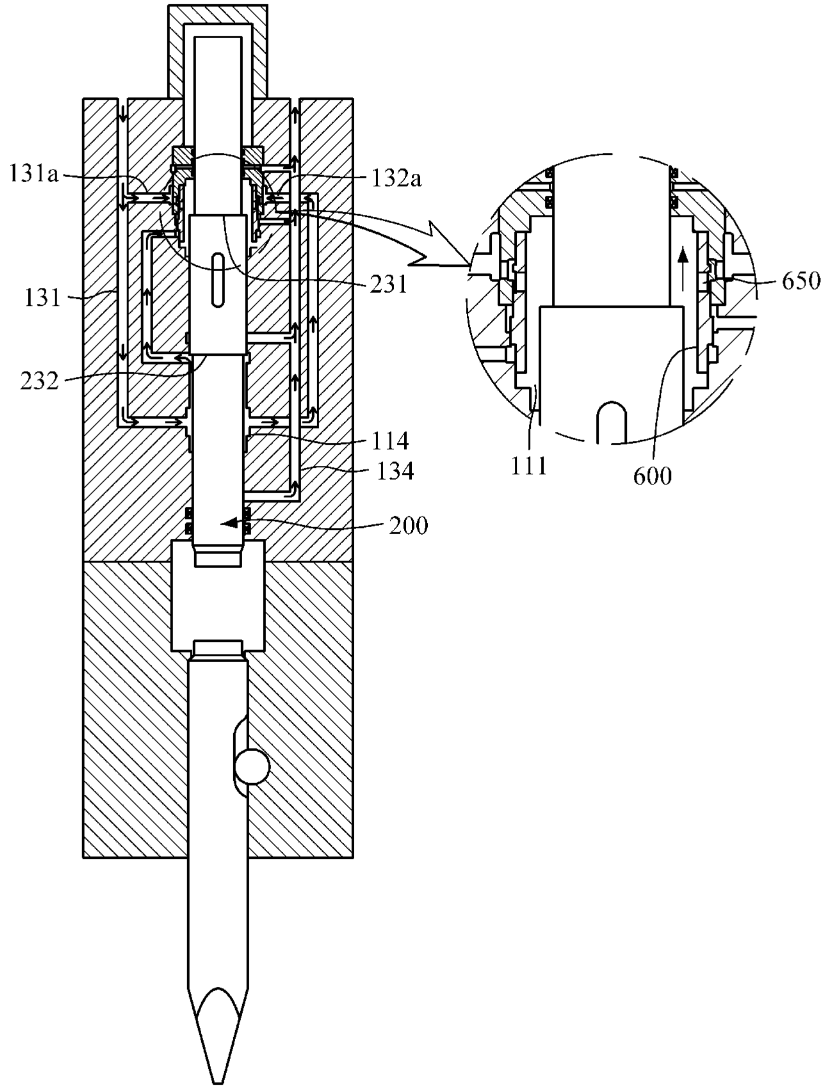

Then, as illustrated in FIG. 7, when the valve 600 is raised, the upper cylinder chamber 111 is disconnected from the fourth flow channel 134 by the valve orifice 650 and communicates with the branched flow channels 131*a* and 132*a* of the first and second flow channels 131 and 132 so that high pressure is generated in the upper cylinder chamber 111 like the lower cylinder chamber 114 connected to the first flow channel 131. In this case, since the upper end piston hydraulic pressure area 231 of the piston 200 is greater than the lower end piston hydraulic pressure area 232, a downward force acts on the piston 200. Accordingly, the piston 200 stops an upward stroke and starts a downward stroke.

Figure 8:
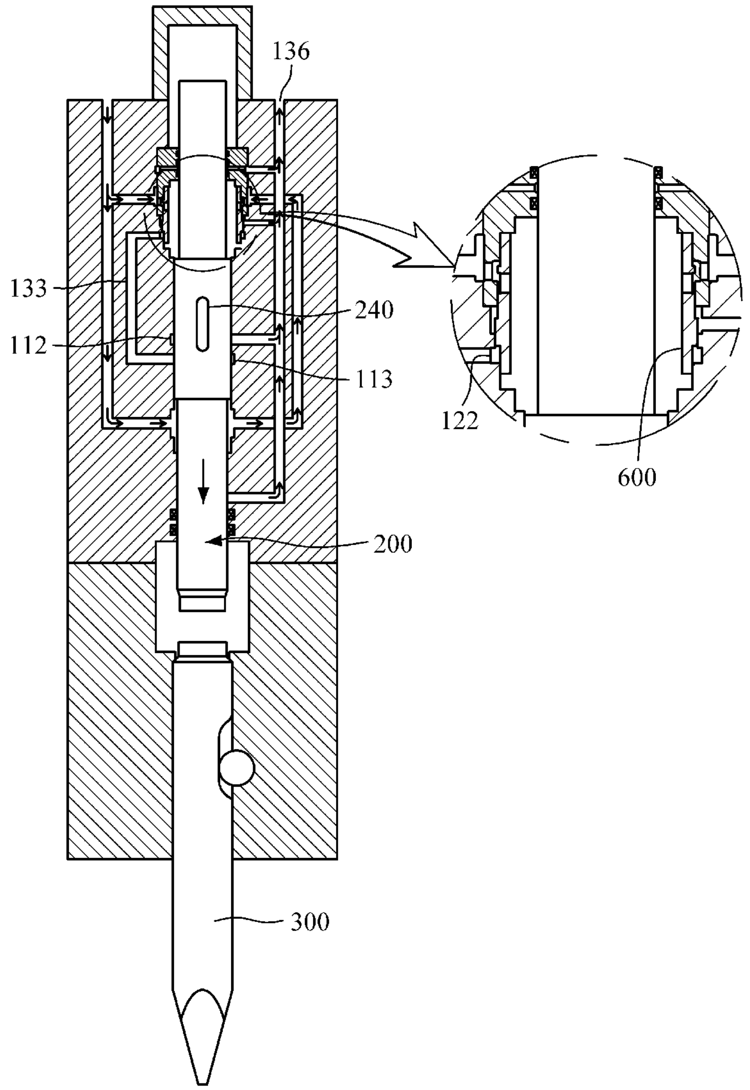
Figure 9:
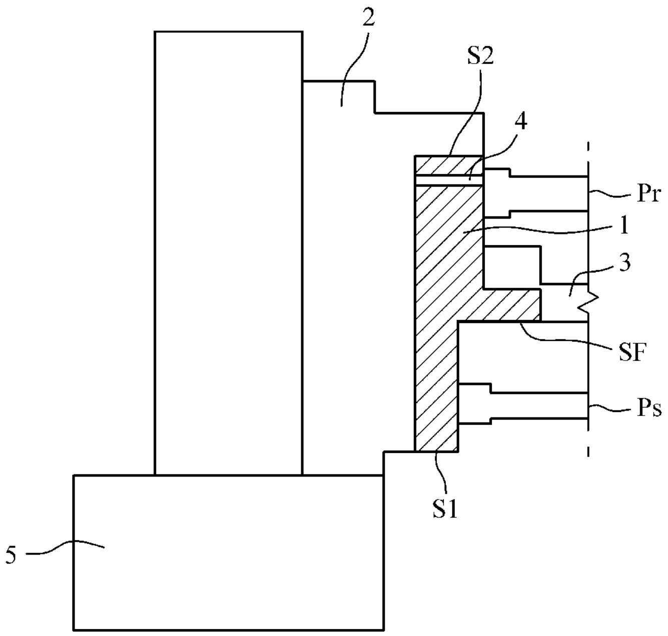
FIG. 9 is a cross-sectional view illustrating a valve device of a conventional hydraulic breaker.
Figure 10:
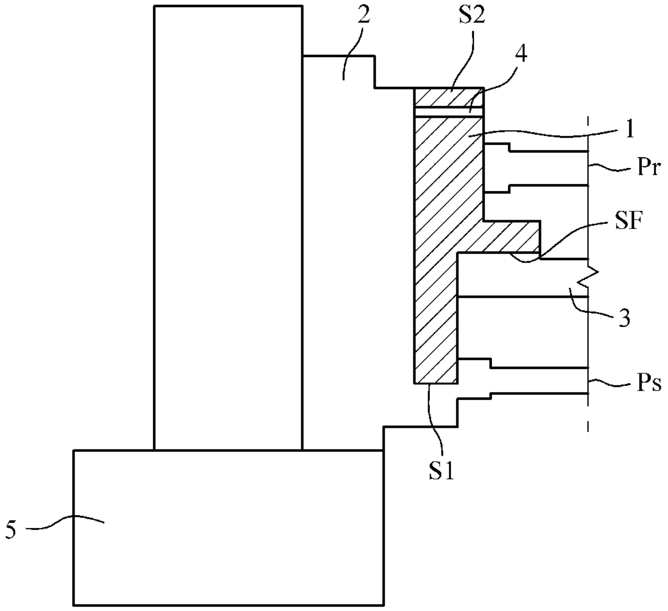
FIG. 10 is a cross-sectional view illustrating operation of the valve device illustrated in FIG. 9.

Then, as illustrated in FIG. 8, after the valve 600 is switched on, the piston 200 continues the downward stroke to strike the chisel 300, and when the piston 200 moves to a strike point at which the piston 200 meets the chisel 300, the flow channel groove 240 of the piston 200 sequentially passes the cylinder low pressure chamber 112 and the cylinder switching chamber 113.

At this time, the valve switching chamber 122 is connected to the cylinder switching chamber 113 through the third flow channel 133, and the cylinder switching chamber 113 and the cylinder low pressure chamber 112 communicate with each other. Accordingly, since the hydraulic oil of the valve switching chamber 122 is discharged to the hydraulic oil outlet port 136 through the third flow channel

133, the cylinder switching chamber 113, and the cylinder low pressure chamber 112, the valve switching chamber 122 is changed from a high pressure state to a low pressure state.

Accordingly, in the valve 600, since a downward force is greater than an upward force, the valve 600 moves in a return direction and returns to an initial state illustrated in FIG. 5, and the piston 200 moves upward again. Due to such an operating principle, the hydraulic breaker repeats the upward and downward strokes to transmit kinetic energy to the breaking target and break the breaking target.

The present invention has been described with reference to one embodiment illustrated in the accompanying drawings, but this is merely exemplary. It will be understood by those skilled in the art that various modifications and equivalent other embodiments may be made. Therefore, the scope of the present invention is defined by the appended claims.

The invention claimed is:

1. A hydraulic breaker comprising:

a cylinder in which a cylinder inner diameter portion is formed in a central portion;

an upper cylinder chamber, a cylinder low pressure chamber, a cylinder switching chamber, and a lower cylinder chamber sequentially formed in a downward direction; and a valve low pressure chamber and a valve switching chamber sequentially formed in the upper cylinder chamber in the downward direction;

a piston installed in the cylinder inner diameter portion to be movable in a vertical direction;

a chisel installed under the cylinder to be struck by the piston;

a back head disposed on the cylinder and including a gas chamber into which an upper end portion of the piston is inserted;

a cylinder bush installed in the cylinder inner diameter portion and coaxial with the piston, the piston accommodated in the cylinder bush to be movable in the vertical direction; and a valve installed on an inner surface of the cylinder bush and the cylinder inner diameter portion to be movable in the vertical direction, wherein the cylinder includes:

a first flow channel connected to a hydraulic oil inlet port in a state in which the upper cylinder chamber and the lower cylinder chamber are connected;

a second flow channel connecting the lower cylinder chamber and the upper cylinder chamber;

a third flow channel connecting the cylinder switching chamber and the valve switching chamber; and a fourth flow channel connected to a hydraulic oil outlet port in a state in which the cylinder low pressure chamber and the valve low pressure chamber are connected, and wherein the valve includes:

an upper valve portion having an upper end surface on which pressure of the upper cylinder chamber acts;

a lower valve portion having a lower end surface on which the pressure of the upper cylinder chamber acts;

a first valve expanded-diameter portion which is formed between the upper valve portion and the lower valve portion, of which an outer diameter expands to be greater than outer diameters of the upper valve portion and the lower valve portion, and in which a first upper valve hydraulic pressure area communicates with the first flow channel and the second flow channels; and a second valve expanded-diameter portion which is formed between the first valve expanded-diameter portion and the lower valve portion, of which an outer diameter expands to be greater than an outer diameter of the first valve expanded-diameter portion, and in which the second upper valve hydraulic pressure area communicates with the fourth flow channel, and pressure of the valve switching chamber acts on a lower valve hydraulic pressure area having an area greater than an area of the first upper valve hydraulic pressure area, and wherein the valve is configured to move reciprocally and uniformly when temperature increases during operation of the hydraulic breaker to decrease viscosity of hydraulic oil in the hydraulic breaker and increase flow rate of the hydraulic oil discharged through the valve such that at least one of the pressure of the upper cylinder chamber is not kept constant, and the force acting on the upper valve portion and the lower valve portion is not kept constant.

2. The hydraulic breaker of claim 1, wherein an upper end surface of the upper valve portion and a lower end surface of the lower valve portion have the same area.

3. The hydraulic breaker of claim 1, wherein the piston includes a flow channel groove which selectively allows or blocks communication between the cylinder switching chamber and the cylinder low pressure chamber when the piston moves in the vertical direction.

* * * * *